Patented Nov. 13, 1945

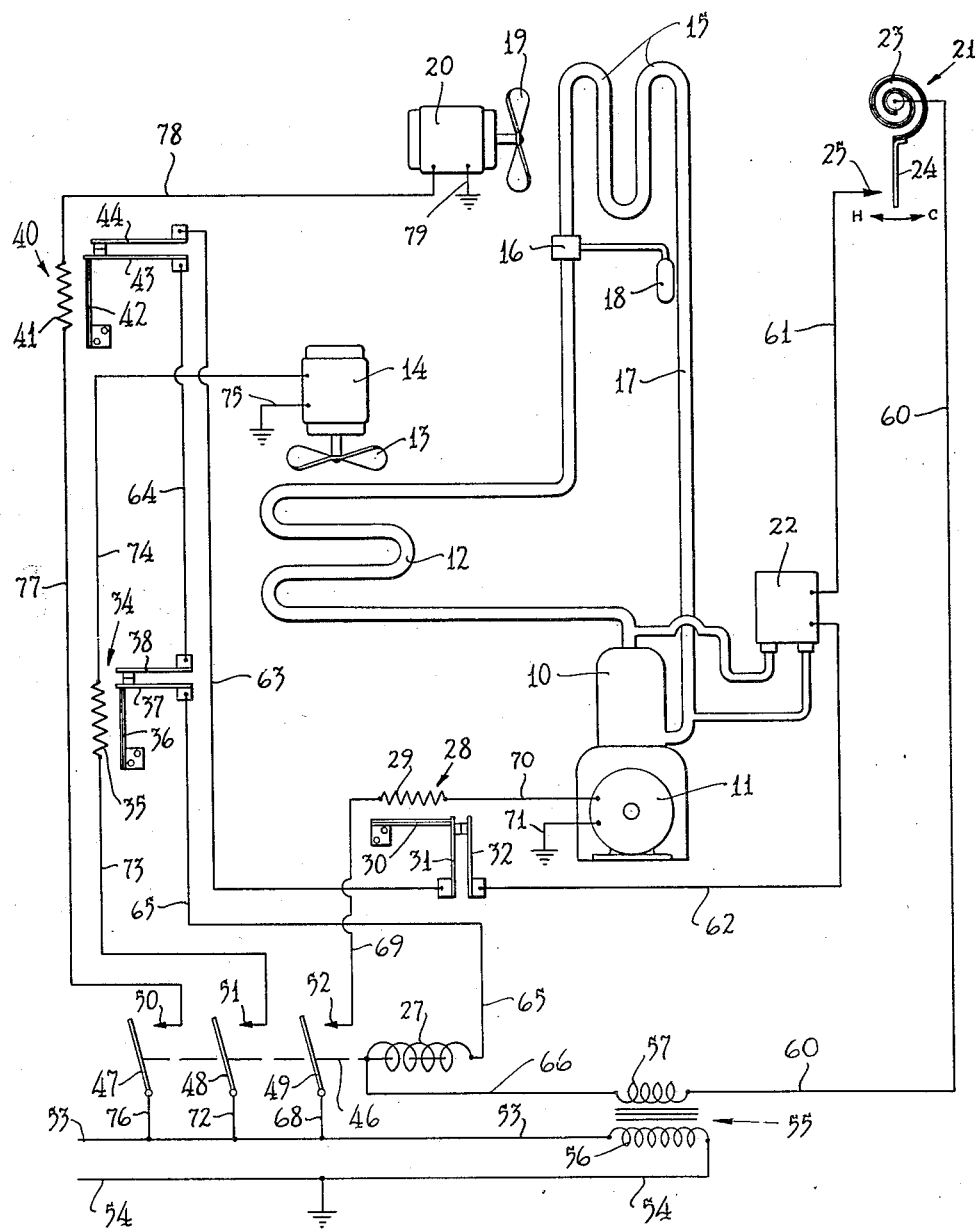

2,389,073

UNITED STATES PATENT OFFICE 2,389,073

OVERLOAD PROTECTION FOR REFRIGERATION SYSTEMS

Alwin B. Newton, Minneapolis, Minn., assignor to Minneapolis-Honeywell Regulator Company, Minneapolis, Minn., a corporation of Delaware Application April 23, 1943, Serial No. 484,152

4 Claims. (Cl. 62—4)

The present invention relates to overload protection wherein it is desired to stop two or more of a group of motors upon an overload condition occurring at any one of the motors and has particular utility in refrigeration and air conditioning systems wherein a plurality of motors are employed.

In commercial refrigerating apparatus for air conditioning or for the preserving of food, for example, it is usual to have a motor driven compressor and a motor driven fan for driving the air over the evaporator and, in addition, a motor operated condensing means is often used. It is obvious that upon the occurrence of an overload condition at any one of these motors, the complete system can no longer function properly and each and every one of the motors should be shut down instead of merely deenergizing that motor wherein the overload condition has occurred.

For example, in a commercial refrigeration system, if the fan motor should be stopped because of an overload condition, but the compressor motor is permitted to continue to run, air will no longer forcibly be circulated over the evaporator and through the storage space. As a result, very little heat will be taken up by the evaporator, the temperature will rise in other parts of the storage compartment, and the compressor will operate for long periods. Excessive frosting of the evaporator will result and may even go so far as to cause a solid freezing of the evaporator. This in turn may well bring about a condition which will be harmful to the compressing apparatus. On the other hand, if the compressor motor should be deenergized because of an overload condition but the fan continues to run, the air will continue to circulate over the evaporator and throughout the storage space. This air will naturally get warm because the evaporator is not being supplied with new refrigerant. The running of the fan in and of itself will add further heat to the air. The circulation of this warm air will cause extra drying out of the food stuff and may even enhance the formation of mold. This will occur much more quickly with the fan running so as to provide a continuous circulation than if the fan were stopped when the compressor motor went out of action. If a condensing means employing a motor is utilized, then it is quite obvious that upon stoppage of such condenser motor because of an overload it would be dangerous and exceedingly inefficient to permit continued compressor motor operation.

It is therefore an object of my invention to provide a motor protective system in which upon the occurrence of an overload condition at either of two or more motors, all of the motors are deenergized even though the remaining motors have not been subjected to an overload condition.

More specifically, it is an object of my invention to provide each of a plurality of motors with an overload responsive mechanism together with switch means controlled by all of the overload responsive mechanisms, which switch means controls the energization of all of the motors.

It is a further object of my invention to provide a refrigeration or air conditioning system having a plurality of motors with an overload protective system wherein each motor has an overload responsive mechanism, all of the overload mechanisms cooperating to shut down each and every one of the motors upon an overload condition occurring at any one of the motors.

Further objects of the invention will become apparent from the following detailed description and accompanying single drawing which discloses one manner of carrying out my invention.

Referring to the drawing, a conventional refrigeration system is shown as comprising a compressor 10 driven by the usual compressor motor 11. The refrigerant compressed by the compressor 10 is delivered to a condenser 12. The condenser 12 may take any suitable and usual form and is herein shown as an air cooled condenser provided with a fan 13 driven by a motor 14. The refrigerant passes from the condenser 12 to an evaporator 15 under the control of the usual thermostatic expansion valve 16, after which the refrigerant returns to the compressor 10 by the usual suction line 17. The thermostatic expansion valve 16 is provided with the usual thermostatic bulb 18 responsive to the temperature of the suction line 17. The evaporator 15 cools any ordinary type of air conditioning or refrigeration apparatus such as a commercial food storing box and air is circulated over the evaporator 15 and throughout the storage compartment by a fan 19 driven by a motor 20.

The refrigeration system may be controlled in any of the usual manners and is herein shown as controlled by a box thermostat 21 and a combined high and low pressure cut-out 22. The thermostat 21 may comprise the usual bimetallic element 23 for operating a contact arm 24 into engagement with a contact 25 upon the temperature within the box rising to some predetermined value. The combined high pressure and suction pressure controller 22 may be of any usual type and, for example, may take the form shown in Carl G. Kronmiller application Serial No. 371,001, filed December 20, 1940, Patent No. 2,377,503, issued June 5, 1945.

The box thermostat 21 and combined high pressure and suction pressure controller 22 control a relay coil 27. This relay coil 27 however is additionally controlled by overload responsive mechanism which responds to the conditions of each of the motors 11, 14 and 20. The overload mechanism for these motors may take any of the usual forms including those types which respond to the temperature of the motor itself but are herein shown as similar in each case and as comprising the electrically heated bimetallic switch actuating type.

The overload cut-out mechanism for the motor 11 is generally indicated at 28. It includes an electric heater 29 which is adapted to heat a bimetallic element 30 having one end fixed. The other end of the bimetallic element 30 holds a contact arm 31 into engagement with a contact arm 32. Upon excessive current flow through the heater 29, the bimetallic element 30 flexes and moves away from contact arm 31 thereby allowing it to separate from contact arm 32 to open a circuit. While a manual reset type of overload cut-out has been shown, it could likewise be of the automatic resetting type.

In a similar manner, the overload cut-out mechanism for the motor 14 is indicated generally at 34. It again includes an electric heater 35 which heats a bimetallic element 36 that is secured at one end. The other end of bimetallic element 36 normally holds a contact arm 37 in engagement with a contact arm 38.

The overload mechanism for the motor 20 is shown generally at 40. It likewise includes an electric heater 41 that heats a bimetallic element 42 secured at one end. The other end of such bimetallic element normally holds a contact arm 43 into engagement with a contact arm 44.

The relay coil 27 controls an armature 46 and, when the coil 27 is energized, the armature 46 moves switch arms 47, 48 and 49 into engagement with contacts 50, 51 and 52. High voltage power is supplied by a hot line 53 and a ground line 54. Low voltage power is supplied by a stepdown transformer 55 having a high voltage primary 56 and a low voltage secondary 57.

*Operation*

With the parts in the position shown, the temperature to which the box thermostat 21 responds is sufficiently low so the apparatus is not operating. After a period of time, the temperature within the box will rise, whereupon the contact arm 24 of the box thermostat 21 will engage the contact 25. The relay coil 27 is thereupon energized by a circuit as follows: from the righthand end of secondary 57, wire 60, bimetallic element 23, contact arm 24, contact 25, wire 61, the combined high pressure and suction pressure control 22, wire 62, contact arm 32, contact arm 31, wire 63, contact arm 44, contact arm 43, wire 64, contact arm 38, contact arm 37, wire 65, relay coil 27, and wire 66 to the left-hand end of secondary 57. Upon energization of relay coil 27, armature 46 is attracted and moves switch arms 47, 48 and 49 into engagement with contacts 50, 51 and 52.

The closure of these relay operated switches sets up energizing circuits for the compressor motor 11, the condenser fan motor 14, and the storage box or evaporator fan motor 20. The circuit for the compressor motor 11 is as follows: line wire 53, wire 68, switch arm 49, contact 52, wire 69, heater 29, wire 70, compressor motor 11, and wire 71 to ground. The circuit for the condenser fan motor 14 is as follows: line wire 53, wire 72, switch arm 48, contact 51, wire 73, heater 35, wire 74, condenser fan motor 14, and wire 75 to ground. The circuit for the evaporator fan motor 20 is as follows: line wire 53, wire 76, switch arm 47, contact 50, wire 77, heater 41, wire 78, evaporator fan motor 20, and wire 79 to ground.

The system will now operate in the normal manner to reduce the temperature of the evaporator, and the air circulated thereover by the fan 19 will cause a reduction in the temperature of the box. As is usual in such systems, if a high head pressure condition or a low suction pressure condition should come about, the combined high pressure and suction pressure controller 22 will interrupt the circuit to relay coil 27, whereupon the three motors of the system will be deenergized. Likewise, upon a reduction in box temperature, the box thermostat 21 will break the circuit between contact arm 24 and contact 25 to deenergize the relay coil 27 and shut down the complete system.

If during operation of the system, however, an overload condition of the compressor motor 11 should occur resulting in a heavy current passing through the heater 29, the bimetallic element 30 will move away from contact arm 31 which in turn will separate from contact arm 32. This will interrupt the previously traced circuit for relay 27 whereupon the switch arms 47, 48 and 49 will disengage their respective contacts 50, 51 and 52 so that each and every one of the motors is deenergized. In other words, an overload condition resulting at the compressor motor 11 not only deenergizes the compressor 11 but additionally deenergizes the condenser fan motor 14 and the evaporator fan motor 20.

In a similar manner, if an overload condition should occur in respect to the condenser fan motor 14, a heavy current will pass through the heater 35. Bimetallic element 36 will therefore move away from switch arm 37, which in turn will disengage the switch arm 38. Such action again causes an interruption of the circuit for relay coil 27 whereupon every one of the three motors of the refrigeration system is deenergized even though the overload condition is only present in respect to the condenser fan motor 14.

In exactly the same manner, if the evaporator fan motor 20 should become overloaded, the heavy passage of current through heater 41 will cause bimetallic element 42 to disengage contact arm 43. Contact arm 43 will thereupon move away from contact arm 44 and once again the circuit for relay 27 will be interrupted. Again, each and every one of the motors in the complete refrigeration system is deenergized even though the only motor which was overloaded is the evaporator fan motor 20.

From the foregoing it will be seen that I have provided a very useful system of motor overload protection. Each motor of a group of motors is provided with overload responsive means that responds to the individual conditions of its associated motor. The arrangement is such, however, that upon any one of the motors becoming overloaded, all of the motors are thereupon placed out of operation. It will be obvious that while I have herein disclosed entirely separate overload cut-outs for each motor, and overload cut-outs of the electrically heated thermostatic element type, any other type of overload responsive means could be utilized. Furthermore, although the system herein disclosed has particular utility in connection with refrigeration systems of the type disclosed, it likewise has utility in other types of refrigeration systems as well as in any systems wherein it is desired to stop the operation of a plurality of motors or other electrical devices upon an overload condition occurring at any one of them. Inasmuch as numerous modifications and changes will occur to those skilled in the art without departing from the spirit of my invention, I intend to be limited only by the scope of the claims appended hereto.

I claim as my invention:

1. In a refrigerating system, a plurality of electric motors, a refrigerant circulating means driven by one of said motors, means responsive to refrigerant pressure, individual overload responsive means responsive to the load conditions of each of said motors, and circuit means controlling the energization of said motors, said circuit means including said refrigerant pressure responsive means and each of said overload responsive means, said circuit means controlling the energization of said motors in such manner that said refrigerant pressure responsive means or any one of said overload responsive means can prevent the energization of any of said motors.

2. In a refrigerating system, a plurality of electric motors, a refrigerant circulating means driven by one of said motors, means responsive to refrigerant pressure, means responsive to a condition of the medium being cooled, individual overload responsive means responsive to the load conditions of each of said motors, and circuit means controlling the energization of said motors, said circuit means including said refrigerant pressure responsive means, said condition responsive means and each of said overload responsive means, said circuit means controlling the energization of said motors in such manner that said refrigerant pressure responsive means, said condition responsive means or any one of said overload responsive means can prevent the energization of any of said motors.

3. In a refrigerating apparatus, in combination, a plurality of electric motors each driving an essential part of said apparatus, one of said motors operating a refrigerant circulating means, means responsive to refrigerant pressure and including a switch, overload responsive means associated with each of said motors, each of said overload responsive means including a switch, relay means controlling the energization of each of said motors, and circuit means controlling the action of said relay, said circuit including each of said switches, said circuit controlling said relay in a manner to prevent the energization of said motors when any one of said switches is open.

4. Control means for a refrigerating apparatus having a plurality of electric motors each in driving relation to an essential part of said apparatus, one of said motors being arranged to drive a refrigerant circulating means, comprising, in combination, a switch device including means responsive to refrigerant pressure, a second switch device including means responsive to the temperature of the medium to be cooled by said apparatus, overload responsive means for each of said motors, each of said overload responsive means operating a switch, relay means for simultaneously controlling the energization of each of said motors, and circuit means including each of said switches for controlling the operation of said relay in such a manner that any one of said switches can prevent the operation of the relay in a manner to energize said motors.

ALWIN B. NEWTON.